(12) United States Patent
Durocher et al.

(10) Patent No.: US 7,950,236 B2
(45) Date of Patent: May 31, 2011

(54) EXHAUST DUCT AND TAIL CONE ATTACHMENT OF AIRCRAFT ENGINES

(75) Inventors: Eric Durocher, Vercheres (CA); Guy Lefebvre, St. Bruno (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 1297 days.

(21) Appl. No.: 11/530,529

(22) Filed: Sep. 11, 2006

(65) Prior Publication Data

US 2008/0060344 A1   Mar. 13, 2008

(51) Int. Cl.
  *F02K 1/00*   (2006.01)
(52) U.S. Cl. ....... 60/770; 60/39.5; 239/265.19; 181/213
(58) Field of Classification Search ............ 60/770, 60/39.5; 239/265.19; 181/213
  See application file for complete search history.

(56) References Cited

U.S. PATENT DOCUMENTS

| 4,989,406 A | | 2/1991 | Vdoviak et al. | |
|---|---|---|---|---|
| 5,076,049 A | * | 12/1991 | Von Benken et al. | 60/797 |
| 5,088,279 A | * | 2/1992 | MacGee | 60/226.1 |
| 5,292,227 A | * | 3/1994 | Czachor et al. | 415/209.3 |
| 2005/0241290 A1 | * | 11/2005 | Lapergue et al. | 60/226.1 |
| 2006/0010852 A1 | | 1/2006 | Gekht et al. | |
| 2007/0059994 A1 | * | 3/2007 | Hutter, III | 439/876 |

* cited by examiner

*Primary Examiner* — Michael Cuff
*Assistant Examiner* — Vikansha S Dwivedi
(74) *Attorney, Agent, or Firm* — Ogilvy Renault LLP

(57) ABSTRACT

An annular exhaust duct of a gas turbine engine includes inner and outer cases co-axially disposed, and radially spaced apart by a plurality of airfoils radially extending therebetween. The outer case includes a connection apparatus for supportably connecting the exhaust duct to the gas turbine engine and the inner case includes an axial end portion at a rear end thereof for connection with a tail cone. The axial end portion bends radially and inwardly at a rear extremity thereof to stiffen the rear end of the inner ease.

8 Claims, 4 Drawing Sheets

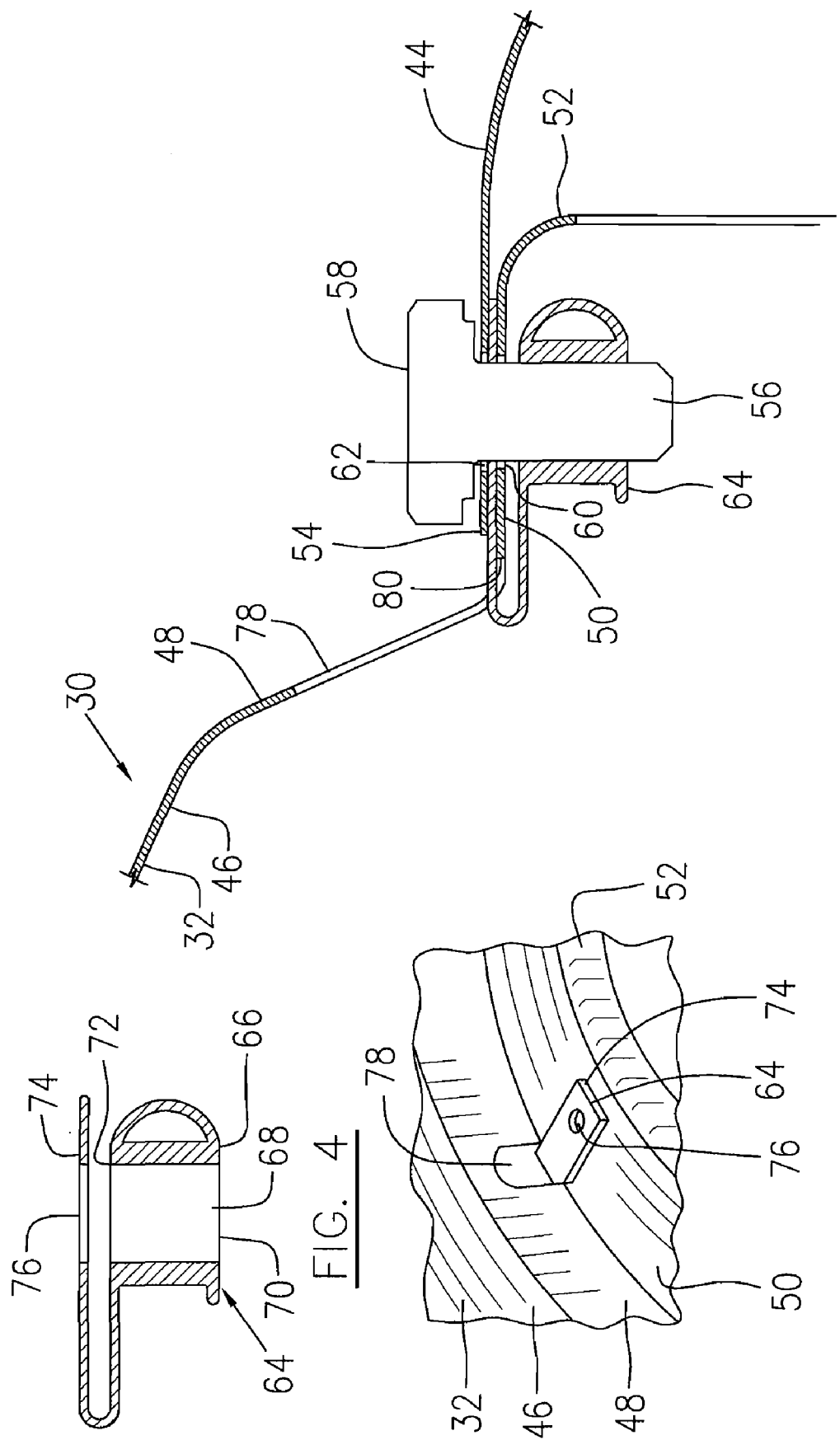

EXHAUST DUCT AND TAIL CONE ATTACHMENT OF AIRCRAFT ENGINES

TECHNICAL FIELD

The invention relates generally to aircraft gas turbine engines, and more particularly to an improved turbine exhaust case of as aircraft gas turbine engine having a configuration for annular exhaust duct and tail cone attachment.

BACKGROUND OF THE ART

A turbine exhaust case of an aircraft gas turbine engine is typically used to form a turbine exhaust, duct for aerodynamic fairing. A tail cone is attached to the aft end of the turbine exhaust case. Radially outwardly extending flange connections which are used for case connections of the engine casing at other locations, are not suitable for the attachment of the tail cone to the exhaust case because the radially outwardly extending flanges would interfere with the aerodynamic fairings of the turbine exhaust duct. Conventionally, a turbine exhaust case is configured with the aft end thereof including an annular axially extending flange to be inserted into the front opening of the tail cone and the two components (the exhaust case and the tail cone) are secured together by fasteners, for example, as shown in FIGS. 6A and 6B. However, the axially extending annular flange, in contrast to the radially outwardly extending annular flanges, adds no additional stiffening reinforcement to the large diametrical open aft end of the turbine exhaust case. In order to stiffen the aft end of the turbine exhaust case, particularly when the turbine exhaust case is made of sheet metal, a ring of thick sheet metal is conventionally attached to the inner surface of the axially extending annular flange of the turbine exhaust case, as more clearly shown in FIG. 6B and indicated by letter A. However, the ring of thick sheet metal added to the aft end of the turbine exhaust case has only limited stiffening function and also adds undesirable weight thereto.

Accordingly, there is a need to provide an improved structural arrangement for annular exhaust duct and tail cone attachment.

SUMMARY OF THE INVENTION

It is therefore as object of this invention to provide an annular exhaust duct of an aircraft gas turbine engine having an improved configuration for exhaust duct and tail cone attachment.

In one aspect, the present invention provides an annular exhaust duct of a gas turbine engine which comprises an inner case and an outer case co-axially disposed and radially spaced apart by a plurality of airfoils radially extending therebetween, thereby defining an annular gas path, the outer case including a connection apparatus for supportably connecting the annular exhaust duct to the gas turbine engine, the inner case including an axial end portion at a rear end thereof for connection with a front, end of a tail cone, the axial end portion bending radially and inwardly at a rear extremity thereof to stiffen the rear end of the inner case.

In another aspect, the present invention provides an annular exhaust duct and tail cone attachment arrangement of a gas turbine engine which comprises an annular exhaust duct having an inner case and an outer case co-axially disposed and radially spaced apart by a plurality of airfoils radially extending therebetween, thereby defining an annular gas path, the outer case including a connection apparatus for supportably connecting the annular exhaust duct to the gas turbine engine, the inner case including an axial end portion at a rear end thereof, the axial end portion bending radially and inwardly at an rear extremity thereof to stiffen the rear end of the inner case; a tail cone including art axial front end thereof connected to the axial end portion of the inner case; and means for securing the axial front end of the tail cone to the axial end portion of the inner case.

In a further aspect, the present invention provides a method for attachment of a tail cone to an annular exhaust duet of a gas turbine engine, the annular exhaust duct having an axial end portion with a radially and inwardly bending extremity at a rear end of the axial end portion, the axial end portion being connected to an adjacent radial wall, the method comprising: 1) positioning a floating nut inside the annular exhaust duct and moving the floating nut rearwardly through an opening defined in the radial wall in order to attach the floating nut to the axial end portion of the annular exhaust duct in a location substantially aligned with a mounting hole defined, in the axial end portion; 2) repeating step 1 to attach other floating nuts to the axial end portion of the annular exhaust duct in other respective locations substantially aligned with other respective mounting holes in the axial end portion, through other respective openings defined in the radial wall; 3) positioning the tail cone to receive the axial end portion of the annular exhaust duct in an axial front end of the tail cone and to substantially align a plurality of mounting holes in the tail cone with the respective mounting holes in the axial end portion of the annular exhaust duct; and 4) inserting a plurality of mounting bolts into the respective substantially aligned pairs of mounting holes to engage the respective floating nuts, thereby securing the tail cone and the annular exhaust duct together.

Further details of these and other aspects of the present invention will be apparent from the detailed description and figures included below.

DESCRIPTION OF THE DRAWINGS

Reference is now made to the accompanying drawings depicting aspects of the present invention, in which:

FIG. 3 is an enlarged portion of FIG. 2, circled and indicated by numeral 3, showing details of the exhaust duct and tail cone attachment of this embodiment;

FIG. 4 is a cross-sectional view of a floating nut used in the exhaust duct and tail cone attachment of FIG. 2;

FIG. 5 is a partial perspective view of the annular exhaust duct shown in FIG. 2, with one floating nut attached thereto;

DETAILED DESCRIPTION OF THE PREFERRED EMBODIMENTS

Figure 1:
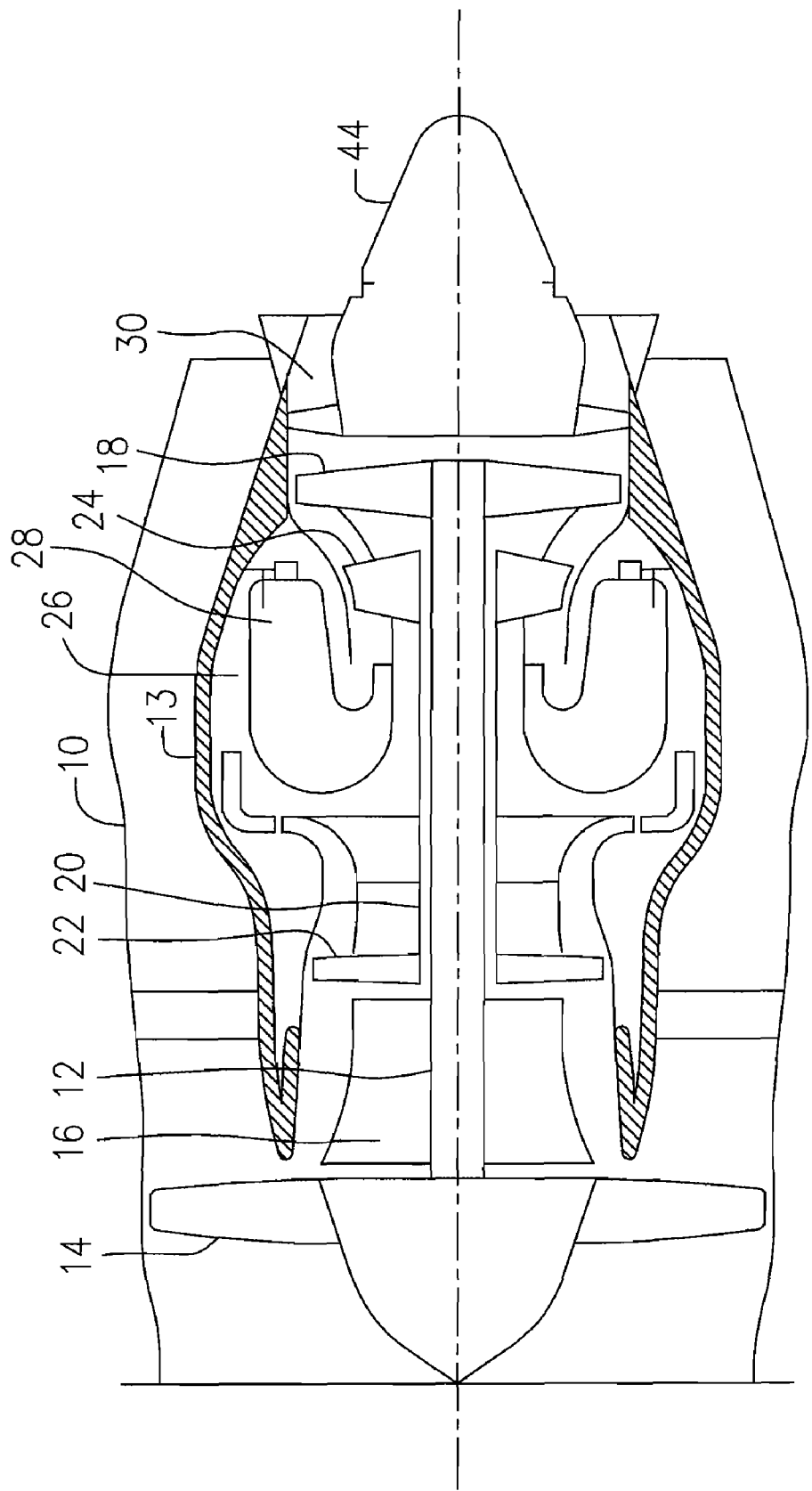
FIG. 1 is a schematic cross-sectional view of a bypass gas turbine engine as an exemplary application of the present invention.

Referring to FIG. 1, a turbofan gas turbine engine presented as an example of the application of the present invention, includes a housing or nacelle 10, a core casing 13, a low pressure spool assembly seen generally at 12 which includes a fan assembly 14, a low pressure compressor assembly 16 and a low pressure turbine assembly 18, and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not indicated) therethrough. In the main fluid path there is provided a combustor 28 to constitute a gas generator section 26, Referring to FIGS. 1-5, the bypass gas turbine engine further includes an annular turbine exhaust duct 30 attached to the core casing 13, as an example of the present invention, which includes an annular inner case 32 and an annular outer case 34. A plurality of circumferentially spaced apart airfoils 36 extend radially between the inner and outer cases 32, 34, to thereby structurally connect same. A bearing housing 38 is co-axially connected to the inner case 32 for supporting an aft end of a main shaft (not indicated) of the low pressure spool assembly 12. Preferably, there is a mixer 40 attached to the rear end of the outer case 34. A mounting flange 42 is integrated with the outer case 34 at a front end thereof for securing the annular turbine exhaust duct 30 to the engine core casing 13, which in turn is structurally connected to the nacelle 10 through a plurality of radially extending struts (not indicated).

A tail cone indicated by numeral 44 is attached to a rear end of the inner case 32 of the annular turbine exhaust duct 30 to cover the opening defined by a rear end of the inner case 32 in order to provide an aerodynamic fairing.

In operation, combustion gases are discharged from the combustor 28 to power the high and low pressure turbine assemblies 24, 18 and are then exhausted into the annular gas path defined between the inner and outer cases 32, 34 of the annular turbine exhaust duct 30. The tangential components included in the exhaust gases are deswirled by the airfoils 36 of the annular turbine exhaust duct 30, and the exhaust gases are then discharged into the atmosphere through the mixer 40 which facilitates mixing of the exhaust gases with a bypass airflow. The turbofan gas turbine engine is supported by an aircraft frame, for example being suspended from the wings thereof by a mounting structure connected to the nacelle 10. Therefore, the annular turbine exhaust duct 30 is part of the mechanical support chain which supports the weight of the entire engine.

In accordance with one embodiment of the present invention, the inner case 32 of the annular turbine exhaust duct 30 is preferably made of sheet metal and is preferably configured with a rear portion 46 which extends axially and inwardly in a smooth curvature, and terminates at an annular radial wall 48. The inner case 32 further includes an annular axial end portion 50 (see FIG. 3) which is connected to, and preferably integrated with the adjacent radial wall 48. The axial end portion 50 includes a radially and inwardly bending extremity 52 at a rear end thereof to stiffen the annular axial end portion 50, which defines an opening having a large diameter.

Figure 2:
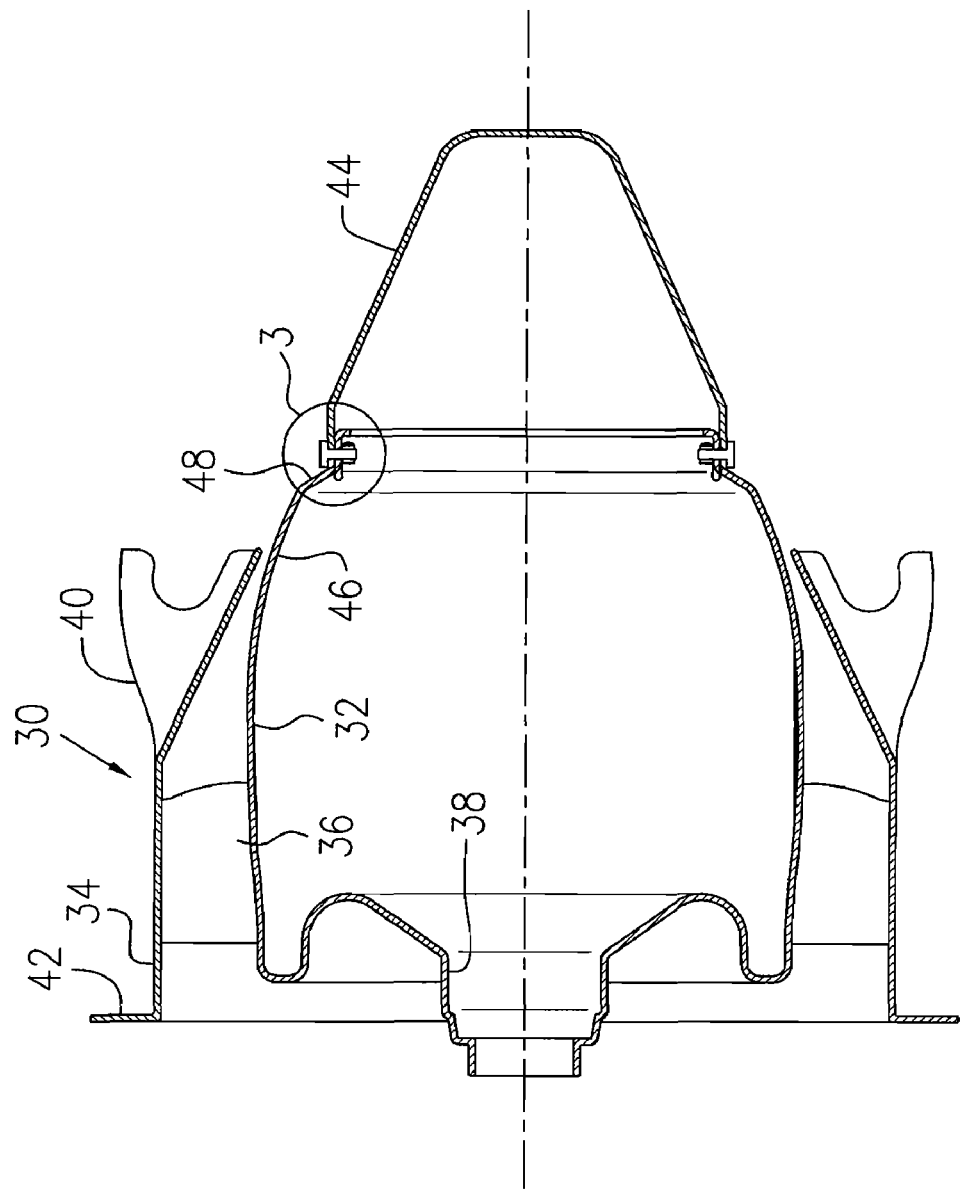
FIG. 2 is a partial cross-sectional view of a gas turbine engine, showing an exhaust duct and tail cone attachment according to one embodiment of the present invention.

The tail cone 44 is preferably made of sheet metal and is shaped generally in a cone configuration with a tail tip preferably truncated, as shown in FIG. 2 or rounded as shown in FIG. 1. The tail cone 44 includes an annular axial front end 54 having an inner diameter slightly greater than the outer diameter of the annular axial end portion 50 of the inner case 32 such that the tail cone 44 can be positioned to properly receive the axial end portion 50 of the inner case 32 in the axial front end 54 such that the tail cone 44 forms an extension of the axially and inwardly extending rear portion 46 of the inner case 32 in a substantially smooth continuity.

It should be noted that the annular radial wall 48 does not necessarily define an annular wall extending perpendicular to the annular axial end portion 50. Instead, the annular radial wall 48, in accordance with this embodiment of the present invention, defines an intermediate annular section between the rear portion 46 and the annular axial end portion 50 of the inner ease 32, which extends more inwardly in contrast to the adjacent axially and inwardly extending rear portion 46, and defines an angle with respect to the axial end portion 50. In such a configuration, the radial wall 48 and the axial front end 54 of the tail cone 44 when attached to the axial end portion 50 of the inner case 32, form an annular recess (not indicated) to accommodate projecting bolt heads 58 when mounting bolts 56 are used to fasten the tail cone 44 and the inner ease 32 together, thereby preventing or reducing interference with the aerodynamic fairing provided by the outer surfaces of the inner case 32 and the tail cone 44.

A plurality of circumferentially spaced mounting holes 60, 62 are provided in the respective annular axial end portion 50 of the inner case 32 and the annular axial front end 54 of the tail cone 44, which are aligned for receiving the respective mounting bolts 56 (only one shown) therethrough when the tail cone 44 is attached to the inner case 32.

A plurality of floating nuts 64 are provided for engagement with the mounting bolts 56. Floating nuts are generally used for attachment to components in order to align with mounting holes particularly where blind mounting is required. Floating nuts can be in a variety of configurations. In this embodiment, the floating nut 64 preferably includes a body 66 defining a threaded hole 68 extending therethrough between opposed flat sides 70, 72. A floating plate 74 extends substantially parallel to and spaced apart from the flat side 72 and is connected at one end thereof, preferably through a U-shaped configuration, to the body 66. The floating plate 74 further defines a hole 76 therethrough and substantially aligning with the threaded hole 68 in the body 66, to allow a mounting bolt 56 to extend therethrough and to engage with the body 66.

Figure 6B:
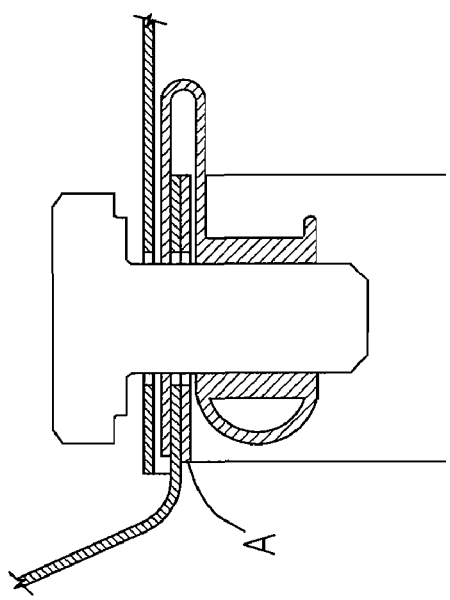
FIG. 6B is an enlarged portion of FIG. 6A, showing details of the prior art configuration of the exhaust duct and tail cone attachment.
Figure 6A:
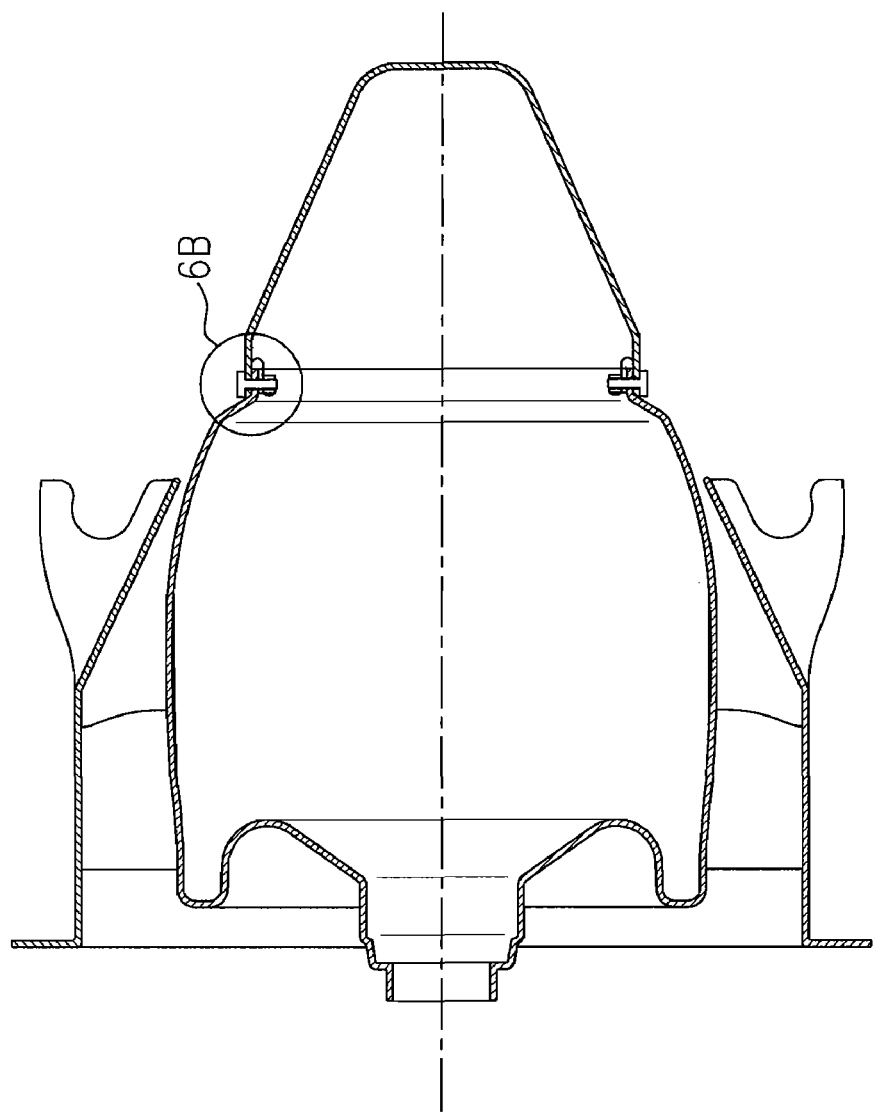
FIG. 6A is a partial cross-sectional view of a gas turbine engine, showing a prior art configuration of an exhaust duct and tail cone attachment.

The floating nuts 64 should be attached to the annular axial end portion 50 of the inner case 32 before the tail cone 44 is attached to the inner case 32. When such floating nuts are used wife a conventionally configured annular turbine exhaust duct as illustrated in FIGS. 6A and 6B, each of the floating nuts can be attached to the inner case from the rear end edge of the axial end portion, as clearly shown in FIG. 6B.

Nevertheless, in this embodiment of the present invention, the radially inwardly bending extremity 52 of the axial end portion 50 of the inner case 32 prevents insertion of the axial end portion 50 through the rear extremity thereof into the slot defined between the floating plate 74 and the body 66. Therefore, a plurality of openings 78 (only one shown in FIGS. 3 and 5) are preferably provided in the annular radial wall 48 of the inner case 32.

The openings 78 preferably axially align with the respective mounting holes 60 defined in the annular axial end portion 50 and extend radially and inwardly and terminate at the annular axial end portion 50 to expose a small section of a front edge 80 of the annular axial end portion 50. The floating plate 74 can be moved rearwardly to pass through the corresponding opening 78 and to receive the axial end portion 50 through the exposed front edge 80 thereof within the slot between the floating plate 74 and the body 66 of the floating nut 64, when the floating nut 64 is attached to the inner case 32. The openings 78, however, can be configured differently and do not necessarily align with (but are most likely adjacent to) the mounting holes 60 in the axial end portion 50 of the inner ease 32, depending on the variety of floating nuts used as alternatives to this embodiment of the present invention.

As shown in FIG. 3, the open front end 54 of the tail cone 44 receives the axial end portion 50 of the inner case 32 with the floating nuts 64 attached thereto, the inner diameter of the front end 54 of the tail cone 44 is preferably slightly larger than the outer diameter of the axial end portion 50 of the inner case 32 by at least twice the thickness of the floating plate 74 of the floating nuts 64.

In a procedure for attaching the tail cone 44 to the annular turbine exhaust duct 30, a floating nut 64 is positioned inside the annular exhaust duct 30 and the slot defined between the floating plate 74 and the nut body 66 is preferably aligned with the exposed section of the front edge 80 of the axial end portion 50. The floating nut 64 is then moved rearwardly through the corresponding opening 78 such that the floating nut 64 is attached to the axial end portion 50 of the annular exhaust duct 30 in a location substantially aligning with a corresponding mounting hole 60 in the axial end portion 50. In a similar way, other floating nuts 64 are attached to the axial end portion 50, substantially aligning with other mounting holes 60 in the axial end portion 50. When all mounting holes 60 are attached with respective floating nuts 64, the tail cone 44 is positioned to receive the axial end portion 50 of the annular exhaust duct 30 in the axial front end 54 of the tail cone 44. The plurality of mounting holes 62 defined in the tail cone 44 are substantially aligned with the mounting holes 60 in the axial end portion 50 (and thus the attached respective floating nuts 64) of the annular exhaust duct 30. Finally, the mounting bolts 56 are inserted into the respective substantially aligned pairs of mounting holes 62, 60 to engage the respective floating nuts 64, thereby securing the tail cone 44 and the annular exhaust duct 30 together.

The above description is meant to be exemplary only, and one skilled in the art will recognize that changes may be made to the embodiments described without departure from the scope of the invention disclosed. For example, turbine annular exhaust ducts different from the turbine annular exhaust duct configuration in the described embodiment, such as one without a mixer, or such as a "non-structural" turbine exhaust case which is basically little more than an aerodynamic fairing and carries no additional load (not supporting a bearing housing and a bearing for a main spool of the engine, for example) may be applicable for this invention, provided that a tail cone is attached thereto. The floating nuts used in the above-described embodiment may be replaced by other suitable fastener devices which are appropriate to engage mounting bolts in a blind mounting situation. Still other modifications which fall within the scope of the present invention will be apparent to those skilled in the art, in light of a review of this disclosure, and such modifications are intended to fall within the appended claims.

The invention claimed is:

1. An annular exhaust duct of a gas turbine engine comprising an inner case and an outer case co-axially disposed and radially spaced apart by a plurality of airfoils radially extending therebetween, thereby defining an annular gas path, the inner case including an axial end portion at a rear end thereof for connection with a front end of a tail cone, the axial end portion bending radially and inwardly at a rear extremity thereof to stiffen the rear end of the inner case, the axial end portion including a plurality of mounting holes for receiving respective mounting bolts radially extending therethrough to secure the axial end portion of the inner case to the front end of the tail cone, the inner case further including a number of openings substantially axially aligning with the respective mounting holes to permit a floating nut to be attached to an inner side of the axial end portion at each mounting hole, the inner case including an annular wall immediately adjacent to the axial end portion, the annular wall extending radially to define an angle between the annular wall and the axial end portion, the openings being disposed in the annular wall and extending radially and inwardly and terminating at the axial end portion.

2. The annular exhaust duct as defined in claim 1 wherein the axial end portion of the inner case comprises a smoothly curved transitional annular surface extending towards the radially inwardly bending extremity thereof.

3. The annular exhaust duct as defined in claim 1 further comprising an exhaust gas mixer connected to an aft end of the outer case, and a bearing housing connected to the inner case for supporting a main spool bearing of the gas turbine engine.

4. The annular exhaust duct as defined in claim 1 wherein the inner case is made of sheet metal.

5. An exhaust duct and tail cone attachment arrangement of a gas turbine engine, comprising:

an annular exhaust duct having an inner case and an outer case co-axially disposed and radially spaced apart by a plurality of airfoils radially extending therebetween, thereby defining an annular gas path, the inner case including an axial end portion at a rear end thereof, the axial end portion bending radially and inwardly at an rear extremity thereof to stiffen the rear end of the inner case;

a tail cone including an axial front end thereof connected to the axial end portion of the inner case; and an apparatus for securing the axial front end of the tail cone to the axial end portion of the inner case, the apparatus including a plurality of mounting holes circumferentially spaced apart and disposed in the respective axial end portion of the inner case and the axial front end of the tail cone, and a plurality of mounting bolts and floating nuts, each of the floating nuts being engaged with one of the mounting bolts which extend through respective pairs of mounting holes in the respective inner case and tail cone, the apparatus further including a number of openings defined in the inner case to permit each of the floating nuts to be axially placed into a position to be attached to the axial end portion of the inner case; and wherein the inner case comprises an annular wall immediately adjacent to the axial end portion, the annular wall extending substantially radially to define an angle between the annular wall and the axial end portion, the openings being disposed in the annular wall and extending radially and inwardly and terminating at the axial end portion.

6. The exhaust duct and tail cone attachment arrangement as defined in claim 5 wherein each of the floating nuts comprises a body defining a threaded hole extending therethrough between opposed first and second sides and a floating plate substantially parallel to and spaced apart from the first side of the body, the floating plate being connected at one end thereof to the body in order to allow a flat section of the axial end portion to be inserted into a slot defined between the body and the floating plate, the floating plate defining a hole therethrough and substantially aligning with the threaded hole in the body to allow one of the mounting bolts to extend therethrough and to engage with the body.

7. The exhaust duct and tail cone attachment arrangement as defined in claim 6 wherein the axial front end of the tail cone has an inner diameter larger than an outer diameter of the axial end portion in order to permit the axial end portion of the inner case to be inserted into the axial front end of the tail cone.

8. The exhaust duct and tail cone attachment arrangement as defined in claim 7 wherein the inner diameter of the axial front end of the tail cone is larger than the outer diameter of the axial end portion by at least twice the thickness of the floating plate of the floating nuts.

\* \* \* \* \*